United States Patent [19]
Brunsting

[11] Patent Number: 5,714,063
[45] Date of Patent: Feb. 3, 1998

[54] APPARATUS FOR THE REMOVAL OF FERROUS PARTICLES FROM LIQUIDS

[76] Inventor: William J. Brunsting, 3181 Douglas Dr., Lake Havasu City, Ariz. 86404

[21] Appl. No.: 654,156

[22] Filed: May 28, 1996

[51] Int. Cl.$^6$ ............................................. B01D 35/06
[52] U.S. Cl. ............................................. 210/222; 210/223
[58] Field of Search ............................... 210/222, 223; 209/224; 184/6.25; 96/1

[56] References Cited

U.S. PATENT DOCUMENTS

| | | | |
|---|---|---|---|
| 1,673,837 | 6/1928 | Lotz | 210/222 |
| 3,402,802 | 9/1968 | Lohmann | 210/222 |
| 3,460,679 | 8/1969 | Llewellyn | 210/223 |
| 3,480,145 | 11/1969 | Gladden | 210/223 |
| 3,722,691 | 3/1973 | Francois | 210/DIG. 17 |
| 4,216,092 | 8/1980 | Shalhoob et al. | 210/222 |
| 4,498,987 | 2/1985 | Inaba | 210/222 |
| 4,992,166 | 2/1991 | Lowsky | 210/222 |
| 5,078,871 | 1/1992 | McCready | 210/223 |
| 5,186,827 | 2/1993 | Liberti | 210/222 |
| 5,269,915 | 12/1993 | Clair | 210/222 |
| 5,510,024 | 4/1996 | Caiozza | 210/223 |

FOREIGN PATENT DOCUMENTS

| | | | |
|---|---|---|---|
| 2158571 | 6/1972 | Germany | 210/222 |
| 3317008 | 11/1984 | Germany | 210/184 |
| 11365 | 3/1980 | Japan | 210/222 |

Primary Examiner—Matthew O. Savage
Attorney, Agent, or Firm—Jack C. Munro

[57] ABSTRACT

A magnetic assembly for removing small entrained ferrous particles from a liquid flow path where the magnetic assembly is to be positioned against a canister or conduit through which the liquid is to flow. A ferrous material flux amplifier band is positioned against the exterior surface of the magnetic assembly. The magnetic assembly will generally be composed of a plurality of separate magnets located in a spaced apart manner. The flux amplifier band is to cover the entire outer surface of the magnetic assembly and also the ends of the magnetic assembly. At the ends, the flux amplifier is spaced from the ends of the magnetic assembly. The surface of the magnetic assembly then is in direct contact with the canister or conduit and precisely conforms to the exterior configuration of the canister or conduit. The interior surface of the canister or conduit is hiatused to form pockets which are to function to catch the entrained ferrous particles within the liquid locating these ferrous particles out of the flow path of the liquid. These pockets could be directly formed on the interior wall of the canister or conduit or could be included within a sleeve which is mounted in a close conforming manner with the interior wall of the canister or conduit. The magnetic assembly and the flux amplifier band could be incorporated within a clamping band with the clamping band including hinge means permitting segmental disengagement of the clamping band from the canister or conduit.

4 Claims, 2 Drawing Sheets

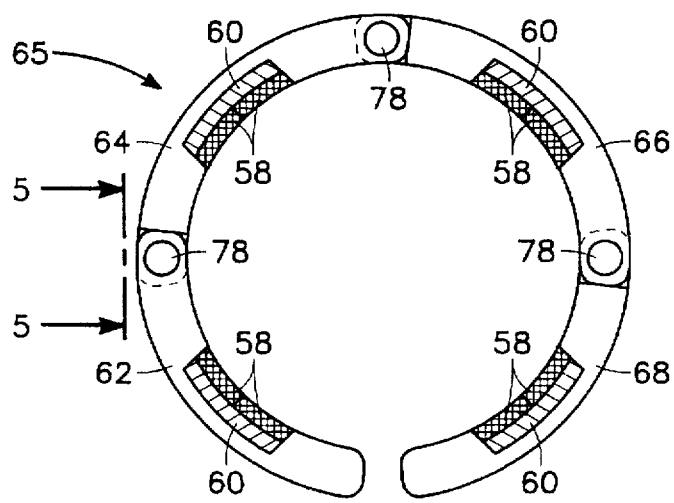
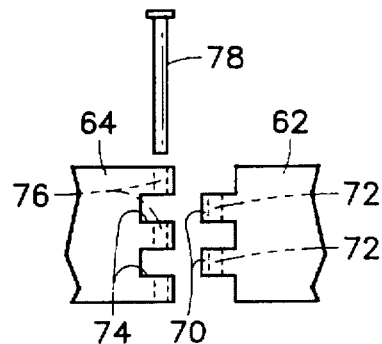
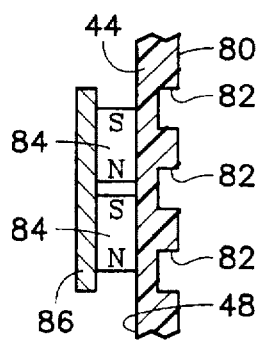
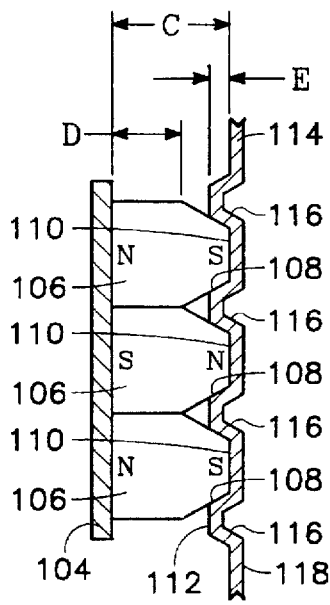
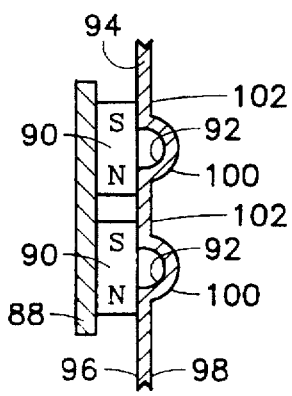
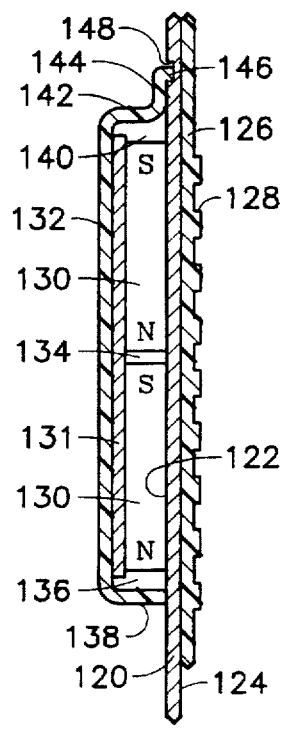

APPARATUS FOR THE REMOVAL OF FERROUS PARTICLES FROM LIQUIDS

BACKGROUND OF THE INVENTION

1) Field of the Invention

The present invention relates generally to an apparatus for removing submicron to micron size ferrous particles from moving liquids and in particular to liquids that are moving through a canister or conduit.

2) Description of the Prior Art

The subject matter of this invention will be discussed in general in connection with internal combustion engines such that are used in automobiles, trucks and boats and the like and particularly in conjunction with the canister shaped oil filter that filter the engine's lubricating oil for the purpose of removing foreign matter therefrom. However, it is to be understood that the subject matter of this invention could be used in connection with any conduit through which a liquid is being moved with the liquid being an oil, water or any other type of liquid.

To eliminate the larger particles of foreign matter, the engine oil is typically forced through a porous material in an oil filter canister that allows the liquid oil to pass therethrough but does not allow the passage of the larger particles. In this manner, the larger particles of foreign matter can be removed from the engine lubricating oil. However, because this separation technique relies upon filtration through a porous material, particles that are smaller than the opening of the porous material are normally not removed by the filter medium. One particularly harmful type of foreign matter in lubricating oil is the small metallic, normally ferrous, particles which are created by the frictional contact between the moving metal parts of the engine. These metallic particulate contaminants can damage important engine components as such circulate through the engine.

Small metallic particles often have a cross-sectional dimension smaller than the openings in the porous filter material. When not removed by the oil filter, the small metallic particles will freely circulate through the engine until such are finally removed when the oil is changed. Typically, the porous material used in oil filters consist of a fibrous material that has openings with an average diameter equal to or greater than twenty microns. Hence, metallic particles with a cross-sectional dimension of twenty microns or smaller are often not trapped by the filter. Some metallic particles are larger than twenty microns. These metallic particles have sharp edges. Movement of these large particles by the force of the flow of the oil will cause these particles to "slice" like a knife through the filter producing holes greater than the twenty microns thereby decreasing the filtering effectiveness of the oil filter.

The micron and submicron size metallic particles are a major cause of wear of moving components of the engine. Specifically, as the oil is circulated throughout the engine to lubricate the various moving components, the metallic particles entrained in the oil are carried to the interface between the moving components. At these locations, the hardness of the metallic particles causes metal to bear against metal, and reliance is placed solely on the oil to maintain the lubricating film. When these metallic particles are brought to these interfaces, damage to the adjoining interfaces is likely. This damage eventually results in a degradation of the close tolerances in the moving parts, causing a loss in operating engine efficiency and more frequent maintenance in the form of repair. By some estimates, these metallic particles are the cause of more than one-half the wear of an engine.

One approach taken by the prior art to eliminate these particles is to install a magnetized drain plug in the crankcase of the engine. The magnetized drain plug generates a magnetic field around the magnet within the crankcase, which in turn attracts and removes some of the metallic particles from the lubricating oil as it flows to the crankcase. However when the engine is running, the flow of oil to the crankcase can be at such a high flow rate so as to carry the metallic particles entirely through the magnetic field produced by the magnetized drain plug. In other cases, the magnetic field itself is insufficiently strong or extensive to remove a meaningful number of particles from the lubricating oil.

Another prior approach to solving this problem has been to attach a magnet to the oil filter canister intending to create a magnetic field within the filter to attract and hold the ferrous particles against the inside surface of the outer wall of the filter. Most of these prior art attempts did not generate a sufficiently strong magnetic field to attract and hold a significant number of the metallic particles in the oil. Within many of the prior art devices, the metallic particles contained in the oil, even if such passed through the magnetic field, are not likely to be attracted and held and thus continue to circulate through the engine.

The problem with not being able to attract and hold the magnetic particles is not only due to the weak magnetic fields of the prior art devices but also due to the velocity of flow of oil through the canister or conduit. The velocity of flow may be sufficient to overcome the holding power of the magnetic force and sweep the entrained ferrous particles from the inside surface of the canister or conduit to cause such to again be moved along with the liquid.

Consequently, a need exists for an improved device for removing micron and submicron sized ferrous particles from a liquid flow path. There is a need for this device to generate a magnetic field of sufficient strength and sufficient depth to move the entrained ferrous particles to directly adjacent the inside wall surface of the conduit or canister. An example of a similar type of device within the prior art that is designed to utilize an exceedingly strong magnetic field is shown within U.S. patent application Ser. No. 08/523,594, filed Sep. 5, 1995, entitled MAGNETIC ASSEMBLY FOR A CLOSED PRESSURIZED FLOW PATH OF LUBRICATING OIL, by the present inventor. The improved device should be mountable on the outside of the conduit or canister and is intended to be readily removed and reusable on different conduits or canisters. Also because the magnetic field is so strong, it is difficult to remove the device from the canister or conduit. Therefore, the device should be constructed to facilitate its removal.

SUMMARY OF THE INVENTION

The subject matter of the present invention is directed to the constructing of a magnetic assembly and conduit or canister in a manner to generate a strong magnetic field, the field having sufficient depth to penetrate radially inward into an oil filter canister or flow path of a liquid conduit with sufficient field strength to attract and retain micron and submicron size ferrous particles. The magnetic assembly is positioned around the outside of the canister or conduit. The magnetic assembly is composed of a plurality of spaced apart magnets with the magnets arranged with their poles being in alternating polarity or being arranged so that the poles between the magnets are of the same polarity. A flux amplifier band covers the outside surface of the magnets with this flux amplifier band to extend past the ends of the magnets and to abut against the canister or conduit. There is an air space between the ends of the magnet and the flux amplifier band. There is also intended to be an air gap between each of the magnets. There should be incorporated a plurality of magnet assemblies (magnets plus a flux amplifier band) within a housing with this housing to be applied to the exterior surface of the canister or conduit. The housing may be constructed of a plurality of segments each of which are connected together by a hinge. The inside surface of the conduit or canister is to include pockets. The poles of the magnets are aligned so that each pole will connect with a pocket. In order to obtain the proper mounting relationship of the magnet assemblies to the canister or conduit, there is formed an indentation or marking arrangement on the exterior surface of the canister or conduit which is to be used to precisely position the magnet assemblies on the canister or conduit. As the liquid is moved through the canister or conduit, the magnetic field generated by the magnetic assemblies attracts the micron and submicron size ferrous metallic particles from the liquid and holds such against the interior surface of the outer wall of the canister or conduit with these particles being collected within pockets, thereby preventing these particles from recirculating. It is important that the flux amplifier band be constructed of ferrous material of high magnetic permeability and that it completely cover the exterior surface of its respective magnet assembly. If the flux amplifier band does not cover the entire exterior surface of its respective magnet assembly, wherever it does not cover, magnetic flux will not be contained and directed toward the canister or conduit. The effect of the flux amplifier band is that if gauss measurements were to be made with a gauss meter, a significantly low reading would be obtained on the back surface of the flux amplifier band with a significantly higher reading being obtained from the surface of the magnet assembly placed in contact with the canister or conduit. It has been found that in order to obtain this desirable gauss reading arrangement, the thickness of the flux amplifier band should be greater than the thickness of the wall of the canister or conduit with three to four times being found to be most satisfactory to contain and direct the magnetic flux generated from the back surface of each magnet assembly.

BRIEF DESCRIPTION OF THE DRAWINGS

FIG. 4 is a top plan view of a clamping band that includes the magnet assemblies and flux amplifier bands of the present invention where the clamping band is formed of a plurality of separate segments which are connected together by hinges.

FIG. 5 is an exploded view showing in more detail one of the hinges utilized within FIG. 4 taken along line 5—5 of FIG. 4;

FIG. 6 is a cross-sectional view similar to FIG. 2 but of a modified form of canister wall or conduit wall where it is of plastic depicting the positioning of the magnet assembly in connection with the wall;

FIG. 7 is a view similar to FIG. 6 where the canister or conduit wall is shown to be of a different configuration;

FIG. 8 is a view similar to FIG. 2 but of a further embodiment of canister wall which requires a different configuration of magnet assembly; and FIG. 9 is a cross-sectional view showing the flux amplifier band being modified to include a hook that is to mate with an indentation formed in the canister or conduit wall for proper positioning of the magnet assembly and also where the inner surface of the conduit or canister includes a sleeve with the inside surface of the sleeve being hiatused to form the pockets that are to catch the entrained ferrous particles.

DETAILED DESCRIPTION OF THE PREFERRED EMBODIMENTS

Figure 1:
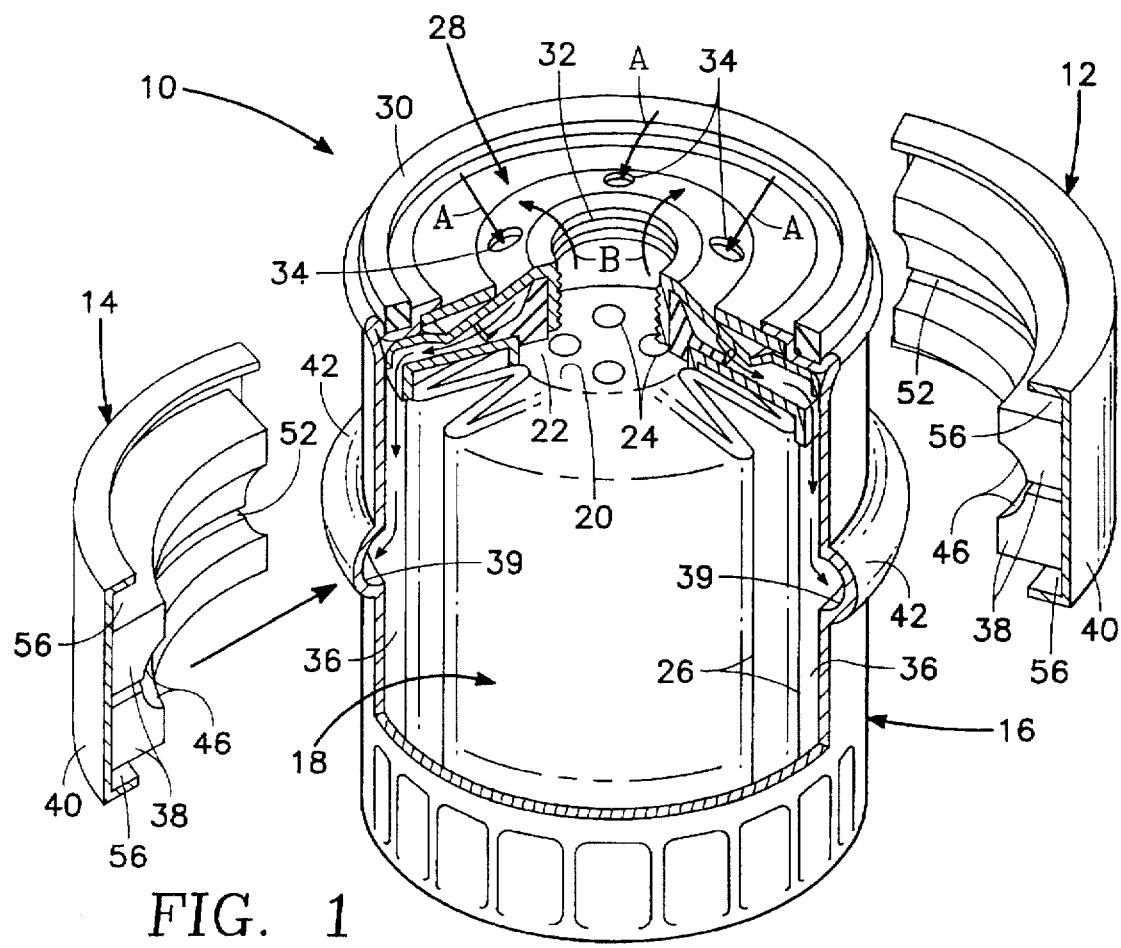
FIG. 1 is an exploded perspective view of a pair of magnet assemblies and connected flux amplifier bands according to this invention for use on a typical oil filter canister which is shown partially sectioned.

FIG. 1 of the drawings illustrates a typical oil filter 10 such as a type PF35 Duraguard Oil Filter manufactured by A.C. Delco, General Motors Corporation, that is used on automotive engines. Connected with the filter 10 is a magnetic system in the form of hemispherically shaped housings 12 and 14. The hemispherically shaped housings 12 and 14 are identical. Although the invention is shown and described with reference to a cylindrically shaped oil filter canister 16, it is to be understood that the hemispherically shaped housings 12 and 14 in this invention could be utilized on non-cylindrically shaped canisters as well and also any structure within which a fluid is moved, such as a conduit.

The cylindrically shaped oil filter canister 16, which is constructed of a thin-walled sheet material ferrous metal such as steel, is typically in the range of 0.014 to 0.018 inches thick for thin walled canisters and 0.028 to 0.032 inches for thicker walled canisters. The thicker wall canisters are normally used on trucks which also have a higher gallon per minute flow rate. A filter element 18 is contained within the cylindrically shaped oil filter canister 16 and is generally cylindrical and accordion folded. The interior of the cylindrically shaped oil filter canister 16 includes a hollow center core 20 with a center shaft liner 22. The center shaft liner 22 has a plurality of circular holes 24 formed therein. A plurality of filter element vanes 26 are positioned entirely around, radially outward and equal distance from the center core 20. Typically, the filter element vanes 26 are made of a porous, fibrous material that allows the lubricating oil to pass through but traps particulate matter.

A circular plate 28, generally made of steel, is flushly mounted to the top end of the cylindrically shaped oil filter canister 16. The circular plate 28 includes a rubber seal 30 and a circular threaded opening 32 positioned in the center of the circular plate 28. Circular threaded opening 32 provides access to the hollow center core 20 inside of the filter element 18. The circular plate 28 also includes a number of circular openings 34 positioned radially outward from the circular threaded opening 32, circumferentially spaced and equidistance from each other.

The oil filter 10 is generally threaded onto a suitable filter mount (not shown) located on an engine (not shown) in conventional fashion so that the lubricating oil of the engine enters the filter 10 through the openings 34 as shown by the arrows A in FIG. 1 to fill an annular region 36 between the interior wall of the cylindrically shaped oil filter canister 16 and the vanes 26 of the filter element 18. The porous nature of the material forming the vanes 26 permits the oil to flow through to the hollow center core 20 while preventing the larger particles of foreign matter entrained in the oil from entering hollow center core 20. The oil entering the hollow center core 20 is then recirculated back into the engine as indicated by arrows B in FIG. 1, through the circular threaded opening 32 to provide lubrication to the engine. Thus, the structure of the oil filter 10 is typical of most disposable canister type oil filters used in conjunction with automobiles, trucks, boats and large generator engines.

The housings 12 and 14 each include a plurality of magnets 38. The magnets 38 may be constructed of any magnetic material possessing sufficient magnetic strength and resistance to long-term effects as heat, oxidation and oil. The magnets 38 may be of a neodymium iron boron composition or any other desirable magnet composition. Normally the magnets 38 have a radial thickness of about 0.175 inches, a width of 0.35 inches and length of about 1.75 inches.

The cylindrically shaped oil filter canister 16 is to have formed therein a plurality of annular grooves 39. In the forming of each annular groove 39 there is produced an annular protrusion 42 protruding from the sidewall of the cylindrically shaped oil filter canister 16. There may be any number of the annular grooves 39 or there may be used only one annular groove 39. The purpose of the annular grooves 39 will be explained further on in this Specification.

The exterior surface of the magnets 38 are bonded or otherwise permanently affixed to an arcuately shaped flux-amplifier band 40. The arcuately shaped flux amplifier band 40 is made out of high permeability steel such as common low carbon, cold rolled steel. Additionally, the arcuately shaped flux amplifier band 40 is preferably dimensioned so that it covers completely the entire exterior surface of the magnets 38. Further, the arcuately shaped flux amplifier band 40 should be thick enough, and therefore have sufficient mass, to substantially carry the magnetic flux generated by the magnets 38, yet also should be sufficiently thin to avoid adding unnecessary weight to the assembly. The arcuately shaped flux amplifier band 40 is to provide an effective, low reluctance path for proper retention and redirection of the flux emanating from magnets 38.

Figure 2:
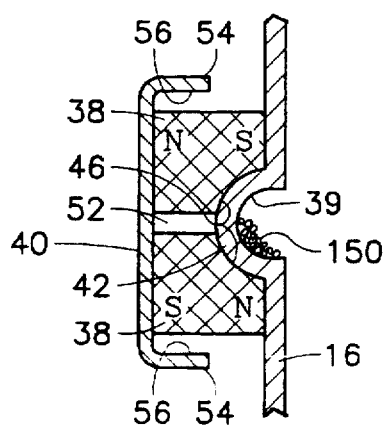
FIG. 2 is a cross-sectional view through one of the magnet assemblies and its flux amplifier band showing its mounting relationship to the canister where the interior wall surface of the canister includes annular grooves where the north-south pole arrangements of the magnets are located perpendicular to the wall surface of the canister.

In the embodiment shown in FIGS. 1 and 2, the arcuately shaped flux amplifier band 40 is comprised of a low carbon, cold rolled steel having a radial thickness of about 0.100 inches. This thickness of arcuately shaped flux amplifier band 40 is to be used with ferrous cylindrically shaped oil filter canister 16 having a thickness between 0.014 inches and 0.018 inches. Note that the thickness of the arcuately shaped flux-amplifier band 40 is greater than the thickness of the wall of the ferrous cylindrically shaped oil filter canister 16. Preferably, the radial outer surface and all other exposed surfaces of the arcuately shaped flux amplifier band 40 are painted or otherwise coated with a suitable rust and oxidation inhibiting coating. The magnets 38 normally are quite brittle and therefore readily susceptible to breakage. If the housing 12 is dropped, breakage is common. If the magnets 38 break, it is important to keep the broken parts of the magnets 38 together into a single unit to avoid producing multiple north/south poles within each magnet 38. Therefore, the inner surface 42 of the magnets 38 will normally be covered by a non-magnetic thin cover (not shown) in a close fitting manner. A typical non-magnetic cover would be stainless steel. If breakage occurs, no movement of the broken pieces of the magnets 38 occurs thereby still having the magnets 38 function in a normal manner.

The housings 12 and 14, which include the magnets 38 and the arcuately shaped flux amplifier bands 40, are positioned around the outer surface of the cylindrically shaped oil filter canister 16 and remain in that position normally solely by the magnetic force itself. No clamping straps are required. However if the cylindrically shaped oil filter canister 16 is to be made of a non-ferrous material, such as the plastic shown as canister wall 44 in FIG. 6 of the drawings and canister wall 41 shown in FIG. 3, some securing means would be necessary such as a clamping band of some sort that encompasses and is to be clamped together about the canister wall 44. At the present time, normally a ferrous material for the cylindrically shaped oil filter canister 16 is less in cost than a plastic for the canister wall 44.

Referring particularly to FIG. 2 of the drawings, it is to be noted that the north and south poles of the magnets 38 are oppositely oriented. This means that one of the magnets 38 the south pole abuts against the cylindrically shaped oil filter canister 16 with the north pole of the other magnet 38 abutting against the cylindrically shaped oil filter canister 16. It is also to be noted that each of the magnets 38 are modified to include a recess 46 with this recess 46 to closely conform in shape to the protrusion 42. It is important that the portion of the magnets 38 that contact the sidewall of the cylindrically shaped oil filter canister 16 contact the sidewall in a flush manner.

Instead of having the north/south poles of the magnets 38 located substantially perpendicular to the cylindrically shaped oil filter canister wall 16, the north/south poles may be arranged in a different orientation. In referring to FIG. 6 of the drawings, the north/south poles are arranged in a direction in alignment with the surface 48 of the canister wall 44. This is also true in FIG. 3 of the drawings where the magnets 50 are positioned so that the line between the poles is located parallel to the wall of canister 16. Also in FIG. 3 it is noted that the north poles of the magnets 50 are located directly adjacent to each other with an air gap 52 located there between. A similar such air gap 52 is located between the magnets 38 in FIG. 2. The fact that the north poles are located directly adjacent each other means that the poles are bucking one another which tends to concentrate the magnetic force and achieve greater depth into the interior of the canister 16. In FIG. 2 of the drawings, the magnetic force of the magnets 38 is more spread out but does not penetrate as far into the canister 16.

Flux amplifier band 40 has ends 54 which extend to about one-half the thickness of the magnets 38. It is important that these ends 54 do not contact the wall of canister 16 as a short circuit will result. As it is important for the flux amplifier band 40 to be in direct physical contact with the outside surface of the magnets 38 and 50, it is just as important that the ends 54 be spaced from the upper and lower ends of the magnets 38 and 50. This will create in FIG. 2 an air gap 56 at both the upper end and the lower end of the magnetic assembly. If a flux amplifier band end 54 short circuits by contacting an end of a magnet, less magnetic flux will be applied into the interior of the canister 16.

Figure 3:
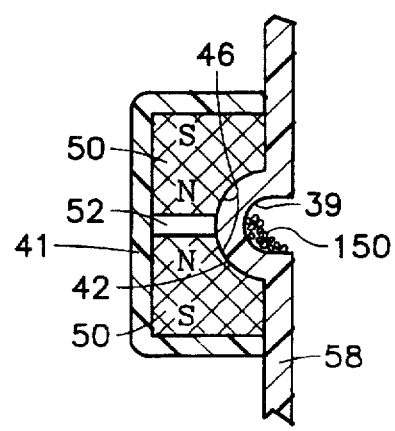
FIG. 3 is a view similar to FIG. 2 but where the north-south pole arrangement of the magnets are located in-line with the wall surface of the canister and also where the north poles are located in a bucking pole arrangement.

In FIG. 3, the canister wall 58 is non-ferrous (plastic). The magnets 50 are arranged so their poles are bucking (north to north). When using a bucking pole arrangement, the band 41 must be non-ferrous. Actually the band 41 functions as a cover and retainer for the magnets 50. The ends of the band 41 can abut against the canister wall 58 when the canister wall 58 is non-ferrous thereby no short circuit is possible. The bucking pole arrangement can generate increased depth of field while still providing a high power level.

It is to be understood that there will normally be several magnets 38 mounted in conjunction with each flux amplifier band 40. The magnets 38 may be in a side-by-side abutting arrangement or they may be slightly spaced apart. Preferably, the magnets 38 are intended to be slightly spaced apart producing an air gap 52 so as to increase the depth of the field within the cylindrically shaped oil filter canister 16. The size of the air gap 52 depends on the magnetic power of the magnets 38 that are used and the flow of the liquid through the filter 10 that it is designed to be used on. The minimum size of air gap 52 should be one tenth of the thickness of the magnet 38. The maximum size of air gap 52 should be equal to the width of the magnet.

Referring particularly to FIG. 4 of the drawings, there is shown four in number of sets of magnets 58. There are two magnets 58 in each set with the magnets 58 located in a side-by-side arrangement. The magnets 58 in each set are shown to be in abutting connection but actually there may be a slight air space there between. Each set of magnets 58 is covered by a flux amplifier band 60. One set of the magnets 58 is mounted within a clamping band segment 62, a second set of magnets 58 being mounted within a clamping band segment 64, a third set of magnets 58 being mounted within a clamping band segment 66 and the remaining set of magnets being mounted within a clamping band segment 68. Actually, each set of magnets 58 and its associated clamping band segment 60 are imbedded within its respective segment 62, 64, 66 and 68. The four clamping band segments 62, 64, 66 and 68, which form clamp band 65, are to be mounted onto the cylindrically shaped oil filter canister wall 16 and is to remain in that position once installed by the holding force of the magnets 58 themselves. The force of the magnets 58 in combination may be so great that it's exceedingly difficult to remove the magnets 58 from the cylindrically shaped oil filter canister 16 for the purpose of placing the magnets 58 on another cylindrically shaped oil filter canister 16. To make the replacement easier, segment 62 has a pair of knuckles 70 formed at one end thereof. Each knuckle 70 includes a hole 72, the holes 72 being in alignment. Each knuckle 70 is to fit within a recess 74 formed within the segment 64. In between the recesses 74 there are formed holes 76 which are also aligned. With the knuckle 70 located within their respective recesses 74, holes 72 and 76 are aligned with a pin 78 to be inserted within the aligned holes. A hinge, therefore, is formed. Similar hinges connect segments 64 and 66 and segments 66 and 68. This will permit a user to only disengage the segment 62 from the cylindrically shaped oil filter canister wall 16 by pivoting of the segment 62 about the pin 78. The user can then disengage the segment 64 in the same manner relative to the segment 66. The user then disengages the segment 66 relative to segment 68 with final removal from the cylindrically shaped oil filter canister 16 comprising disengagement of the segment 68. The clamping band shown in FIG. 4 is thereby completely disengaged from the cylindrically shaped oil filter canister wall 16.

Referring particularly to FIG. 6 of the drawings, there is shown, as previously mentioned, the plastic canister wall 44. The plastic canister wall 44 has an interior surface 80 which has formed therein a series of annular grooves 82. The annular grooves 82 are spaced apart. The grooves 82 may not be annular but may only comprise a segment of a circle. Mounted on the exterior wall 48 of the canister wall 44 are magnets 84. A flux amplifier band 86 covers the magnets 84. The pole of each magnet 44 is oriented to align with the approximate transverse center of one of the grooves 82. This alignment is preferred to maximize the magnetic field within each of the grooves 82. As liquid moves alongside the interior surface 80, the magnetic field will tend to extract ferrous particles causing such to be located within the grooves 82 and be held therein, now out of the flow path of the liquid.

Referring particularly to FIG. 7 of the drawings, there is shown a further embodiment of this invention which uses a flux amplifier band 88 covering magnets 90. The poles of the magnets 90 are aligned with annular recesses 92 which are formed on the exterior wall surface 96 of the canister wall 94. The interior wall surface 98 of the canister wall 94 thereby has formed a plurality of spaced apart annular protuberances 100. In between the protuberances 100 are formed pockets 102. The entrained ferrous particles 150 that are captured by the field of the magnets 90 are to be held within the pockets 102.

Referring particularly to FIG. 8 of the drawings, there is shown a flux amplifier band 104 which is mounted against three in number of magnets 106. The outer end of each of the magnets 106 is in the shape of a truncated cone 108. This outer end 108 is to be mounted within an appropriately identically shaped annular groove 110 with there being three in number of the annular grooves 110 shown in FIG. 8. The annular grooves 110 are formed within the exterior wall 112 of the canister wall 114. The result is there is formed annular recesses 116 within the interior wall surface 118 of the canister wall 114. The magnetic force of the magnets 106 will tend to cause entrained ferrous particles 150 to collect and be held within the annular recesses 116. To ensure the maximum amount of magnetic energy is applied through the canister wall 114 to the greatest depth, it is important that the height of each of the magnets 106 to the start of the truncated cone 108, which is referenced as distance D, be less than one-half of the height of each magnet 106 which is shown as distance C. Also the depth of each of the annular grooves 110 which is shown as distance E must be less than one-half of A. Exceeding of these distance parameters will result in short circuiting of the magnets 106 where the canister wall 114 is ferrous.

Referring particularly to FIG. 9 of the drawings, there is shown a canister wall 120 which has both a smooth exterior surface 122 and a smooth interior surface 124. This type of canister wall 120 is what is conventionally being used at the present time. In order to have the interior wall 124 be hiatused, there is inserted a sleeve 126 within the internal chamber of the canister wall 120 with the sleeve 126 being located directly against the interior wall surface 124. The sleeve 126 may or may not be of ferrous material and generally a plastic material would be preferred. The interior wall surface of the sleeve 126 includes a plurality of spaced apart annular grooves 128. The magnets 130, which are mounted against the exterior wall surface 122, permit a sufficiently strong enough magnetic field to cause entrained ferrous particles 150 to collect within the annular grooves 128 and be held therein. The magnets 130 are covered by a flux amplifier band 131. The flux amplifier band 131 is covered by a plastic cover 132. The magnets 130 have an air space 134 formed there between. Between the lower end of the magnets 130 and the depending flange section 138 of cover 132 is an air space 136. A similar air space 140 is located between the upper end of the magnets 130 and the depending flange 142 of the cover 132. The depending flange 142 has an extension 144 which terminates in a hook 146. This hook 146 is to be locatable within an indentation 148 formed within the exterior wall surface 122 of the canister wall 120. The purpose of the hook 146 and the indentation 148 is to precisely locate the magnets 130 on the canister wall 120 so that the magnets 130 will be properly positioned for maximum efficiency to the relative annular grooves 128. As previously stated, each of the poles of the magnets 130 are to align with a groove 128. Any of numerous aligning arrangements could be used other than the indentation 148.

It is to be reiterated that each of the magnets discussed within this patent application is to have an inner surface that is to abut flush with the wall of the canister on which it is mounted. Any air gap between the magnets and the canister wall will result in a substantial loss of effectiveness of the conducting of the magnetic field within the internal chamber of the cylindrically shaped oil filter canister 16.

Shown in FIG. 1 of the drawings, multiple magnet assemblies 12 and 14 are preferably used on a single cylindrically shaped oil filter canister 16 to provide coverage around substantially the entire circumference of the cylindrically shaped oil filter canister 16. The housings 12 and 14 are preferably positioned proximate the top end of the cylindrically shaped oil filter canister 16 but slightly spaced therefrom so that the magnetic field generated attracts ferrous metallic particles 150 as such enter the cylindrically shaped oil filter canister 16 through the holes 34 formed within the circular plate 28. Multiple housings 12 and 14 can be positioned both axially and circumferentially on the cylindrically shaped oil filter canister 16 to provide the preferred coverage for larger sized filter canisters.

What is claimed is:

1. In combination with a canister having a sheet material outer wall enclosing an internal chamber, said outer wall having an exterior surface and a smooth walled interior surface, a liquid containing entrained ferrous metal particles to circulate through said internal chamber along a flow path, a magnetic assembly for removing said entrained ferrous particles from said liquid, said magnetic assembly comprising:

magnet means mounted on the exterior surface of said sheet material outer wall; and an annular sleeve located within said internal chamber, said annular sleeve positioned against said interior surface closely conforming to said interior surface, said annular sleeve having a radially inner surface positioned adjacent said flow path, said inner surface having a plurality of annular grooves formed therein adapted to catch said ferrous particles locating said ferrous particles out of the flow path of said liquid, said magnet means causing said ferrous particles to move from said flow path into said annular grooves and to remain in said annular grooves.

2. The combination as defined in claim 1 wherein:

said magnetic assembly having an external surface, a flux amplifier band composed of ferrous sheet material being mounted directly against said external surface of said magnetic assembly, said flux amplifier band having sufficiently high permeance to direct said magnetic field proximate said magnetic assembly and substantially increase the strength of said magnetic field within said internal chamber when compared to using said magnetic assembly without said flux amplifier band, thereby more effectively attracting and holding said ferrous particles against said interior surface of said outer wall.

3. The combination as defined in claim 1, wherein said magnetic means is mounted on a clamping band, said clamping band including hinge means permitting segmental disengagement of said clamping band from said outer wall.

4. The combination as defined in claim 3, wherein said outer wall includes precise locating means which is to connect with said clamping band to precisely position said clamping band on said outer wall.

* * * * *